United States Patent [19]

Diephouse et al.

[11] Patent Number: 4,600,767

[45] Date of Patent: Jul. 15, 1986

[54] THERMOSTABLE HYDROXYSTYRYLAZA COMPOUNDS

[75] Inventors: Tim R. Diephouse, Midland, Mich.; Randy J. LaTulip; John W. Robinson, both of Lake Jackson, Tex.; Gary R. Gantt, Brazoria, Tex.

[73] Assignee: The Dow Chemical Company, Midland, Mich.

[21] Appl. No.: 766,843

[22] Filed: Aug. 16, 1985

[51] Int. Cl.$^4$ .................. C08G 12/28; C08G 12/26
[52] U.S. Cl. .................. 528/252; 428/290; 525/398; 525/402; 528/248
[58] Field of Search ............ 525/402, 398; 528/248, 528/252

[56] References Cited

U.S. PATENT DOCUMENTS

| | | | |
|---|---|---|---|
| 4,471,107 | 9/1984 | Peake | 528/248 |
| 4,543,388 | 9/1985 | Treybig et al. | 528/252 X |

*Primary Examiner*—Lucille M. Phynes
*Attorney, Agent, or Firm*—Benjamin G. Colley

[57] ABSTRACT

Thermostable hydroxystyrylaza compounds are prepared by reacting methylated pyridines and/or pyrazines with one or more monohydroxy aromatic aldehydes having the ortho and para positions to the hydroxy group block with groups inert to condensation reactions. These compounds are useful to make unsaturated derivatives which can cure into high temperature resistant polymers and/or laminates without giving off condensation products.

8 Claims, No Drawings

THERMOSTABLE HYDROXYSTYRYLAZA COMPOUNDS

BACKGROUND OF THE INVENTION

This invention relates to thermostable hydroxystyrylaza compounds prepared from the reaction of methylated pyridines or pyrazines with one or more monohydroxy aromatic aldehydes having the ortho and para positions relative to the hydroxy group blocked with groups inert to condensation reactions.

It is known from U.S. Pat. Nos. 4,515,938 and 4,525,573 that methylated pyridines can be reacted with hydroxy benzaldehydes to form oligomeric mixtures useful for making laminates.

SUMMARY OF THE INVENTION

It now has been found that useful thermostable hydroxystyrylaza compounds can be made by reacting mono-hydroxy aromatic aldehydes having the ortho and para positions to the hydroxy group blocked by inert groups with alkyl azine compounds such as methylated pyridines and pyrazines.

These new thermostable hydroxystyrylaza compounds will not homopolymerize below 250° C., and as such, are ideally suited as building blocks for various derivatization and/or copolymerization processes which utilize the pendant aromatic alcohol functionality. Examples of uses for the new compounds are curing agents for epoxy compounds. The compounds can also be made into useful curable compounds by reacting them with propargyl halides or vinyl halides. These propargyl or vinyl capped compounds can be polymerized and made into high temperature laminates. By employing the proper derivatization or copolymerization process, a non-volatile (non-condensation type) cure mechanism can be obtained, which is advantageous in the preparation of laminated structures having a high char yield.

These blocked hydroxystyrylaza compounds, with respect to the unblocked hydroxystyrylaza prepolymer of the prior art, offer a certain number of advantages within the scope of this invention. The hydroxy functionality of the blocked hydroxystyrylaza product can be tailored specifically to the desired value by adjusting the functionality of the alkyl azine starting material. Additionally, a product of mixed hydroxy functionality can be obtained by employing a mixture of alkyl azine starting materials during the synthesis. The hydroxy functionality of the unblocked hydroxystyrylaza prepolymer is difficult to control due to the inherent crosslinking that occurs during synthesis.

The fact that the compounds of the present invention will not crosslink provides them with the additional advantage of solubility in low boiling solvents, such as acetone, methanol, methylene chloride, etc.

The invention is thus thermostable compounds which are the reaction product of (A) one or more mono-hydroxy aromatic aldehydes wherein the ortho and para positions from the hydroxy group having no aldehyde group are substituted by groups inert to condensation with alkyl azines, and (B) one or more alkyl azine compounds having the formula

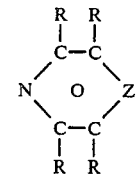

where Z is N, C—CH$_3$, C—CH$_2$—CH$_3$, or C—H; R is hydrogen, methyl, or ethyl with the proviso that the total number of methyl groups substituted on the azine ring is in the range from 2–4.

DESCRIPTION OF THE PREFERRED EMBODIMENTS

The compounds of this invention are prepared by reacting alkylated azine compounds such as methyl pyridines or pyrazines with a particular class of hydroxy aromatic aldehyde having the ortho and para positions from the hydroxy group inert to the condensation with alkyl azine compounds.

The starting materials are heated under a nitrogen atmosphere with stirring to a temperature in the range from 140° to 260° C. for a period of 2 hours to 7 days. The preferred temperature range is 165° to 180° C. The reaction can be monitored for completeness by sampling the reaction mixture and having it analyzed for the disappearance of the carbonyl group and the onset of trans unsaturation.

The aromatic aldehydes useful in this invention have the formula

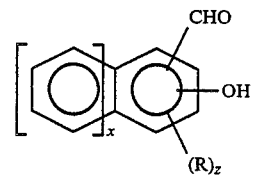

where
x is 0 or 1,
z is 2 to 4,
R is selected from the group consisting of alkyl, alkyl ether, alkenyl, phenyl, halogen and nitro with the proviso that the ortho and para positions from the hydroxy group having no aldehyde groups are substituted by one or more of the R groups set forth above.

Examples of useful para-hydroxy benzaldehydes are
3,5-dimethyl-4-hydroxy-benzaldehyde;
3,5-diethyl-4-hydroxy-benzaldehyde;
3,5-dibromo-4-hydroxy-benzaldehyde;
3,5-dichloro-4-hydroxy-benzaldehyde;
3,5-diphenyl-4-hydroxy-benzaldehyde;
3,5-dimethyl-2,6-dibromo-4-hydroxy-benzaldehyde;
3-methoxy-5-chloro-4-hydroxy-benzaldehyde;
3-methoxy-2,5,6-tribromo-4-hydroxy-benzaldehyde;
3-methoxy-5-allyl-4-hydroxy-benzaldehyde;
3,5-methoxy-4-hydroxy-benzaldehyde;
3,5-di-t-butyl-4-hydroxy-benzaldehyde;
3-ethoxy-5-bromo-4-hydroxy-benzaldehyde;
3-methoxy-5-nitro-4-hydroxy-benzaldehyde.

Examples of useful ortho hydroxy aldehydes are
2-hydroxy-3-bromo-1-naphthoic aldehyde;
2-hydroxy-3,5-dimethyl-benzaldehyde;
2-hydroxy-3,5-dichloro-benzaldehyde;
2-hydroxy-3-ethoxy-5-bromo-benzaldehyde.

Examples of meta hydroxy benzaldehydes are 3-hydroxy-2,4,6-trimethyl-benzaldehyde, and 3-hydroxy-2,6-bromo-4-methoxy-benzaldehyde.

Examples of useful pyridines are 2,3-dimethyl pyridine, 2,4-dimethyl pyridine, 2,5-dimethyl pyridine, 2,6-dimethyl pyridine, 3,4-dimethyl pyridine, 3,5-dimethyl pyridine, 3,5-dimethyl-2-ethyl pyridine, 2,3,4,6-tetramethyl pyridine, 2,3,5-trimethyl pyridine, 2,3,6-trimethyl pyridine, 2,4,5-trimethyl pyridine and 2,4,6-trimethyl pyridine.

Examples of useful pyrazines are 2,5-dimethyl pyrazine, 2,3-dimethyl pyrazine, 2,5-dimethyl pyrazine, 2,3,5-trimethyl pyrazine and 2,3,5,6-tetramethyl pyrazines.

Catalysts that can be used are sulfuric acid, hydrochloric acid, zinc chloride, acetic anhydride, aluminum chloride, toluene disulfonic acid, trichloro acetic acid, p-toluene sulfonic acid and acetic acid. The catalysts are used in amounts from 0.1 to 20 weight percent based on the total weight of the reactants and preferrably in amounts from 1 to 5 weight percent. It is to be understood that the reaction can proceed in the absence of catalyst but the reaction time is much longer.

The reaction is conducted with 0.1 to 10 molar equivalents of carbonyl groups to 1 molar equivalent of methyl groups on the azine ring. The preferred range of carbonyl to methyl groups is 1.5 molar equivalents of carbonyl groups to 1 molar equivalent of methyl groups.

The hydroxy functional compounds of this invention can be reacted with propargyl halides and vinyl halides such as propargyl bromide, propargyl chloride, vinyl bromide, or vinyl chloride to obtain the corresponding propargyl or vinyl capped compounds.

These compounds can be heated, cured or combined with fibers such as graphite, fiberglass, aramid or asbestos to form high temperture resistant laminate with a high char yield.

The examples which follow are presented to illustrate but not limit the invention.

EXAMPLE I 213.7 g of 3,5-dimethyl-4-hydroxybenzaldehyde (1.1 moles), 58.3 g of 2,4,6-trimethylpyridine (0.48 mole) and 4 g of $H_2SO_4$ (0.18 mole) were placed in a 1-liter resin kettle equipped with a mechanical stirrer, $N_2$ purge, therometer and reflux condenser which was run at 100° C. with hot oil to allow the water to distill over and be collected. The kettle was heated to 180° C. using I.R. lamps with stirring for approximately 16 hours. The material was then allowed to cool to room temperature and ground into a fine powder. The powder was then poured into 2 liters of boiling water and stirred for 1 hour to remove the unreacted starting materials. This procedure was repeated two times with fresh 2 liters of boiling water. The water was filtered and the filtrate was dried in a vacuum oven. The material collected had a melting point of 140° C. It was soluble in acetone, methanol and other low-boiling solvents. The I.R. scan showed a medium peak at approximately 960 cm$^{-1}$ indicative of the stilbazole double bond, no absorption at 1675 cm$^{-1}$ indicative of the carbonyl absorption, and a strong broad peak at 3400 cm$^{-1}$ due to the —OH absorption.

EXAMPLE II 221.7 g of 3,5-dimethyl-4-hydroxybenzaldehyde (1.48 moles), 79.3 g of 2,6-lutidine (0.74 mole) and 3.5 g of $H_2SO_4$ (0.04 mole) were placed in a one-liter resin kettle equipped with a mechanical stirrer, $N_2$ purge, thermometer and a reflux condenser which was run at 100° C. with hot oil to allow the water to distill over and be collected but not the starting materials. The kettle was heated to 155° C. using I.R. lamps with stirring for approximately 113 hours. Lutidine was added after 50 hours to replace the lutidine going overhead (approximately 25 g). The material was then purified by heating to 150° C. in a vacuum oven under full vacuum for 2 hours. The melting point after the vacuum oven distillation was approximately 130° C. The material was soluble in low-boiling solvent. I.R. scan showed a medium peak at 960 cm$^{-1}$, indicative of the stilbazole double bond, a broad peak at 3400 cm$^{-1}$, indicative of —OH, and no peak at 1675 cm$^{-1}$, indicative of the absence of carbonyl groups.

EXAMPLE III

Epoxy compound cured with tris-(3,5-dimethyl-4-hydroxystyryl)pyridine

50/50 wt % mixture of tris(phenylglycidyl ether) methane, and tris-(3,5-dimethyl-4-hydroxystyryl)pyridine was made by first melting the glycidyl ether compound and heating to approximately 100° C. The tris-(3,5-dimethyl-4-hydroxystyryl)pyridine was then added. Within minutes the material dissolved and heating continued with stirring until the material became very viscous. The material was then allowed to cool to room temperature and ground into a fine powder. The powder was pressed at 150° C. for 10 minutes, 175° C. for 1 hour, 200° C. for 1 hour, and 225° C. for 2 hours to give a dark black polymer with no voids. The polymer had a char yield of 36.2% @ 950° C. in $N_2$ and a Tg of 210° C. by Dynamic Mechanical Analysis (DMA). This material is made into a composite by either hot melt or solvent prepregging to give a high temperature material.

EXAMPLE IV

Homopolymer of propargyl-capped bis-(3,5-dimethyl-4-hydroxystyryl)pyridine 50 g of bis-(3,5-dimethyl-4-hydroxystyryl)pyridine of Example II (0.10 mole), 18 g KOH (0.32 mole), and 300 ml of dimethylformamide were placed in a 500 ml, 3-necked round bottom flask equipped with mechanical stirrer, $N_2$ purge, reflux condenser and an addition funnel. The flask heated to 80° C. at which time 40 g of propargyl bromide was added dropwise over a two-and-one-half hour period. After the last of the propargyl bromide had been added, the reaction mixture was heated for an additional 2 hours and 45 minutes. The reaction mixture was allowed to cool to room temperature and filtered to remove any KOH. To precipitate the proparyl capped 3,5-dimethyl-4-hydroxy-styryl-pyridine 1500 ml of a mixture of 50/50 acetone and deionized water was added. The precipitate which resulted was filtered and dried at 120° C. in a vacuum oven. The material had softening point of 60° C. and a melting point of 97°-102° C. The material was then B-staged at 180° C. for one hour and pressed at 180° C. for 10 minutes, 190° C. for 10 minutes, and 200° C. for 2 hours to give a dark black polymer. The polymer exhibited a 50% weight loss in air at 360° C. by thermogravimetric analysis.

EXAMPLE V

Graphite 2-ply composite of propargyl capped bis-(3,5-dimethyl-4-hydroxystyryl)pyridine A sample of the propargyl capped bis-(3,5-dimethyl-4-hydroxy-styryl)pyridine of Example IV was hot melted onto two pieces of graphite cloth to approximate 60% loading on each piece. The two prepregs were B-staged at 180° C. for one hour. The prepregs were then pressed at the following conditions:

10 minutes @ 180° C., 980 psi
10 minutes @ 190° C., 980 psi
120 minutes @ 200° C., 980 psi The cured specimen was cooled under pressure and removed from the press.

EXAMPLE VI

An unblocked hydroxystyrylaza prepolymer was prepared in accordance with U.S. Pat. No. 4,515,938 by reacting 3 moles of salicyladehyde with 1 mole of 2,4,6-trimethyl pyridine at 170°–175° C. for 4 hours in the presence of sulfuric acid catalyst (6 mole % based on the moles of methyl pyridine). The solid reddish brown prepolymer had a melting point of 145°–155° C. A one gram sample of this unblocked prepolymer and a one gram sample of the blocked hydroxystyrylaza product (melting point 140° C.) prepared in Example I were simultaneously placed in a convection oven preset at 170° C. and maintained there for 12 hours duration. The melting points for the two samples after 12 hours at 170° C. were:

Ex. I: Hydroxystyrylaza Product 145°–150° C.
Ex. VI: Unblocked Hydroxy Aza Prepolymer 210°–230° C.

We claim:

1. Thermostable hydroxystyrylaza compounds which comprise the reaction products of
   (A) one or more mono-hydroxy aromatic aldehydes wherein the ortho and para positions from the hydroxy group having no aldehyde group are substituted by groups inert to condensation with alkyl azines, and
   (B) one or more alkyl azine compounds having the formula

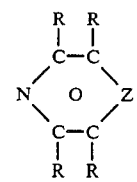

where Z is N, C—$CH^3$, C—$CH^2$—$CH^3$, or C—H;
R is hydrogen, methyl, or ethyl with the proviso that the total number of methyl groups substituted on the azine ring is in the range from 2–4.

2. The compounds of claim 1 wherein said aldehyde inert groups are selected from the group consisting of alkyl, alkyl ether, alkenyl, phenyl, halogen and nitro groups.

3. The compounds of claim 1 wherein said aromatic aldehydes have the formula

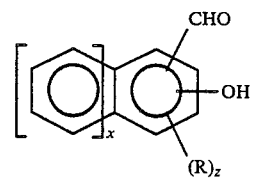

where
x is 0 or 1
z is 2 to 4
R is selected from the group consisting of alkyl, alkyl ether, alkenyl, phenyl, halogen and nitro with the proviso that the ortho and para positions from the hydroxy group having no aldehyde groups are substituted by one or more of the R groups set forth above.

4. The compounds of claim 1 wherein said aromatic aldehyde is 4-hydroxy-3,5-dimethyl benzaldehyde and said azine is 2,5-dimethyl pyrazine or 2,3,5,6-tetramethyl pyrazine, or a mixture thereof.

5. The compounds of claim 1 wherein said aromatic aldehyde is 4-hydroxy 3,5-dimethyl benzaldehyde and said azine is 2,4,6-trimethyl pyridine, or 2,6-dimethyl pyridine, or a mixture thereof.

6. The curable compounds which comprise the reaction products of the compounds of claim 1 with propargyl halides or vinyl halides.

7. The heat cured product of claim 6.

8. A cured fibrous laminate made with the compounds of claim 6.

* * * * *